(12) United States Patent
Etchegoyen

(10) Patent No.: US 10,489,562 B2
(45) Date of Patent: *Nov. 26, 2019

(54) MODULAR SOFTWARE PROTECTION

(71) Applicant: UNILOC LUXEMBOURG S.A., Luxembourg (LU)

(72) Inventor: Craig S. Etchegoyen, Plano, TX (US)

(73) Assignee: Uniloc 2017 LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,392

(22) Filed: Apr. 10, 2017

(65) Prior Publication Data

US 2017/0277870 A1    Sep. 28, 2017

Related U.S. Application Data

(63) Continuation of application No. 12/784,380, filed on May 20, 2010, now Pat. No. 9,633,183.

(Continued)

(51) Int. Cl.
*H04L 29/00* (2006.01)
*G06F 21/12* (2013.01)
*G06F 21/73* (2013.01)

(52) U.S. Cl.
CPC ............ *G06F 21/121* (2013.01); *G06F 21/73* (2013.01); *G06F 2221/0704* (2013.01)

(58) Field of Classification Search
CPC . G06F 21/121; G06F 21/73; G06F 2221/0704
See application file for complete search history.

(56) References Cited

U.S. PATENT DOCUMENTS 4,278,837 A    7/1981    Best
4,351,982 A    9/1982    Miller et al.
(Continued)

FOREIGN PATENT DOCUMENTS

AU          678985        6/1997
DE    40 19 652 A1       1/1992
(Continued)

OTHER PUBLICATIONS

Osgood, David, Letter to Rhythms Researcher, Mini-Mitter Co., Inc., after 1990, 2 pgs.
(Continued)

*Primary Examiner* — Jeffrey C Pwu
*Assistant Examiner* — Helai Salehi
(74) *Attorney, Agent, or Firm* — Sean D. Burdick

(57) ABSTRACT

A method for modular software protection includes steps for receiving, at a server, a license key registered for a software executable installed on a client device and machine fingerprint data generated at the client device, accessing, using the server, stored usage rights data indicated by the license key, the usage rights data specifying a number of client devices on which the software executable is licensed to operate and which features of the software executable are enabled, determining, using the machine fingerprint data received by the server, whether operation of the software executable on the client device would cause the number of client devices on which the software executable is licensed to operate to be exceeded, and creating, in response to the determining step, an encrypted license file for transmission to the client device that defines separate features of the software executable to be enabled on the client device.

5 Claims, 5 Drawing Sheets

Related U.S. Application Data

(60) Provisional application No. 61/218,558, filed on Jun. 19, 2009.

(56) References Cited

U.S. PATENT DOCUMENTS

| | | | |
|---|---|---|---|
| 4,446,519 A | 5/1984 | Thomas |
| 4,458,315 A | 7/1984 | Uchenick |
| 4,471,163 A | 9/1984 | Donald et al. |
| 4,484,217 A | 11/1984 | Block et al. |
| 4,593,353 A | 6/1986 | Pickholtz |
| 4,593,376 A | 6/1986 | Volk |
| 4,599,489 A | 7/1986 | Cargile |
| 4,609,777 A | 9/1986 | Cargile |
| 4,646,234 A | 2/1987 | Tolman et al. |
| 4,654,799 A | 3/1987 | Ogaki et al. |
| 4,658,093 A | 4/1987 | Hellman |
| 4,683,553 A | 7/1987 | Mollier |
| 4,685,055 A | 8/1987 | Thomas |
| 4,688,169 A | 8/1987 | Joshi |
| 4,704,610 A | 11/1987 | Smith et al. |
| 4,712,238 A | 12/1987 | Gilhousen et al. |
| 4,780,821 A | 10/1988 | Crossley |
| 4,740,890 A | 12/1988 | William |
| 4,791,565 A | 12/1988 | Dunham et al. |
| 4,796,181 A | 1/1989 | Wiedemer |
| 4,796,220 A | 1/1989 | Wolfe |
| 4,817,140 A | 3/1989 | Chandra et al. |
| 4,827,508 A | 5/1989 | Shear |
| 4,864,494 A | 9/1989 | Kobus, Jr. |
| 4,866,769 A | 9/1989 | Karp |
| 4,888,798 A | 12/1989 | Earnest |
| 4,903,296 A | 2/1990 | Chandra et al. |
| 4,924,378 A | 5/1990 | Hershey et al. |
| 4,937,863 A | 6/1990 | Robert et al. |
| 4,959,861 A | 9/1990 | Howlette |
| 4,982,430 A | 1/1991 | Frezza et al. |
| 4,999,806 A | 3/1991 | Chernow et al. |
| 5,014,234 A | 5/1991 | Edwards, Jr. |
| 5,023,907 A | 6/1991 | Johnson et al. |
| 5,033,084 A | 7/1991 | Beecher |
| 5,034,980 A | 7/1991 | Kubota |
| 5,047,928 A | 9/1991 | Wiedemer |
| 5,081,676 A | 1/1992 | Chou et al. |
| 5,083,309 A | 1/1992 | Beysson |
| 5,103,476 A | 4/1992 | Waite et al. |
| 5,109,413 A | 4/1992 | Comerford et al. |
| 5,113,518 A | 5/1992 | Durst et al. |
| 5,138,712 A | 8/1992 | Corbin |
| 5,146,575 A | 9/1992 | Nolan, Jr. |
| 5,199,066 A | 3/1993 | Logan |
| 5,204,897 A | 4/1993 | Wyman |
| 5,210,795 A | 5/1993 | Lipner et al. |
| 5,222,133 A | 6/1993 | Chou et al. |
| 5,222,134 A | 6/1993 | Waite et al. |
| 5,259,029 A | 11/1993 | Duncan, Jr. |
| 5,260,999 A | 11/1993 | Wyman |
| 5,287,408 A | 2/1994 | Samson |
| 5,291,598 A | 3/1994 | Grundy |
| 5,319,705 A | 6/1994 | Halter et al. |
| 5,337,357 A | 8/1994 | Chou et al. |
| 5,341,429 A | 8/1994 | Stringer et al. |
| 5,343,526 A | 8/1994 | Lassers |
| 5,375,240 A | 12/1994 | Grundy |
| 5,379,433 A | 1/1995 | Yamagishi |
| 5,390,297 A | 2/1995 | Barber et al. |
| 5,414,269 A | 5/1995 | Takahashi |
| 5,418,854 A | 5/1995 | Kaufman et al. |
| 5,440,635 A | 8/1995 | Bellovin et al. |
| 5,490,216 A | 2/1996 | Richardson, III |
| 5,495,411 A | 2/1996 | Ananda |
| 5,509,070 A | 4/1996 | Schull |
| 5,548,645 A | 8/1996 | Ananda |
| 5,559,884 A | 9/1996 | Davidson et al. |
| 5,579,222 A | 11/1996 | Bains et al. |
| 5,638,513 A | 6/1997 | Ananda |
| 5,666,415 A | 9/1997 | Kaufman |
| 5,671,412 A | 9/1997 | Christiano |
| 5,703,951 A | 12/1997 | Dolphin |
| 5,745,879 A | 4/1998 | Wyman |
| 5,752,041 A | 5/1998 | Fosdick |
| 5,754,763 A | 5/1998 | Bereiter |
| 5,754,864 A | 5/1998 | Hill |
| 5,778,368 A | 7/1998 | Hogan et al. |
| 5,790,664 A | 8/1998 | Coley et al. |
| 5,835,911 A | 11/1998 | Nakagawa et al. |
| 5,845,077 A | 12/1998 | Fawcett |
| 5,867,713 A | 2/1999 | Shrader et al. |
| 5,881,236 A | 3/1999 | Dickey |
| 5,893,910 A | 4/1999 | Martineau et al. |
| 5,919,247 A | 7/1999 | Van Hoff et al. |
| 5,925,127 A | 7/1999 | Ahmad |
| 5,940,504 A | 8/1999 | Griswold |
| 5,956,505 A | 9/1999 | Manduley |
| 5,974,150 A | 10/1999 | Kaish et al. |
| 6,006,035 A | 12/1999 | Nabahi |
| 6,006,190 A | 12/1999 | Baena-Arnaiz et al. |
| 6,009,401 A | 12/1999 | Horstmann |
| 6,029,141 A | 2/2000 | Bezos |
| 6,044,471 A | 3/2000 | Colvin |
| 6,049,789 A | 4/2000 | Frison et al. |
| 6,070,171 A | 5/2000 | Snyder et al. |
| 6,101,606 A | 8/2000 | Diersch et al. |
| 6,134,659 A | 10/2000 | Sprong et al. |
| 6,158,005 A | 12/2000 | Bharathan et al. |
| 6,169,976 B1 | 1/2001 | Colosso |
| 6,189,146 B1 | 2/2001 | Misra et al. |
| 6,195,432 B1 | 2/2001 | Takahashi et al. |
| 6,208,995 B1 | 3/2001 | Himmel et al. |
| 6,226,747 B1 | 5/2001 | Larsson et al. |
| 6,230,199 B1 | 5/2001 | Revashetti et al. |
| 6,233,567 B1 | 5/2001 | Cohen |
| 6,236,971 B1 | 5/2001 | Stefik et al. |
| 6,243,468 B1 | 6/2001 | Pearce et al. |
| 6,294,793 B1 | 9/2001 | Brunfeld et al. |
| 6,327,573 B1 | 12/2001 | Walker et al. |
| 6,327,617 B1 | 12/2001 | Fawcett |
| 6,330,670 B1 | 12/2001 | England et al. |
| 6,343,280 B2 | 1/2002 | Clark |
| 6,363,486 B1 | 3/2002 | Knapton, III |
| 6,449,645 B1 | 9/2002 | Nash |
| 6,467,088 B1 | 10/2002 | alSafadi et al. |
| 6,536,005 B1 | 3/2003 | Augarten |
| 6,557,105 B1 | 4/2003 | Tardo et al. |
| 6,587,842 B1 | 7/2003 | Watts |
| 6,697,948 B1 | 2/2004 | Rabin et al. |
| 6,785,825 B2 | 8/2004 | Colvin |
| 6,829,596 B1 | 12/2004 | Frazee |
| 6,857,078 B2 | 2/2005 | Colvin |
| 6,859,793 B1 | 2/2005 | Lambiase |
| 6,880,086 B2 | 4/2005 | Kidder et al. |
| 6,920,567 B1 | 7/2005 | Doherty et al. |
| 6,976,009 B2 | 12/2005 | Tadayon et al. |
| 7,020,635 B2 | 3/2006 | Hamilton et al. |
| 7,024,696 B1 | 4/2006 | Bahar |
| 7,032,110 B1 | 4/2006 | Su et al. |
| 7,069,440 B2 | 6/2006 | Aull |
| 7,069,595 B2 | 6/2006 | Cognigni et al. |
| 7,085,741 B2 | 8/2006 | Lao et al. |
| 7,131,144 B2 * | 10/2006 | Rabin .................... G06F 21/10 726/30 |
| 7,146,645 B1 | 12/2006 | Hellsten et al. |
| 7,188,241 B2 | 3/2007 | Cronce et al. |
| 7,203,966 B2 | 4/2007 | Abburi et al. |
| 7,206,765 B2 | 4/2007 | Gilliam et al. |
| 7,228,567 B2 | 6/2007 | Serkowski et al. |
| 7,272,728 B2 | 9/2007 | Pierson et al. |
| 7,313,828 B2 | 12/2007 | Holopainen |
| 7,319,987 B1 | 1/2008 | Hoffman et al. |
| 7,327,280 B2 | 2/2008 | Bachelder et al. |
| 7,328,453 B2 | 2/2008 | Merkle et al. |
| 7,337,147 B2 | 2/2008 | Chen et al. |
| 7,343,297 B2 | 3/2008 | Bergler et al. |
| 7,463,945 B2 | 12/2008 | Kiesel et al. |
| 7,587,502 B2 | 9/2009 | Crawford et al. |

(56) References Cited

U.S. PATENT DOCUMENTS

| | | |
|---|---|---|
| 7,644,442 B2 | 1/2010 | Miller et al. |
| 7,653,899 B1 | 1/2010 | Lindahi et al. |
| 7,676,804 B2 | 3/2010 | Ferguson et al. |
| 7,711,586 B2 | 5/2010 | Aggarwal et al. |
| 7,870,273 B2 | 1/2011 | Watson et al. |
| 7,890,950 B1 | 2/2011 | Nanavati et al. |
| 7,908,662 B2 | 3/2011 | Richardson |
| 7,912,787 B2 | 3/2011 | Sakakakihara et al. |
| 8,229,858 B1 | 7/2012 | Mazza et al. |
| 8,266,062 B2 | 9/2012 | Mishra |
| 8,694,434 B1 | 4/2014 | Kley |
| 2001/0034712 A1 | 10/2001 | Colvin |
| 2001/0044782 A1 | 11/2001 | Hughes et al. |
| 2002/0019814 A1 | 2/2002 | Ganesan |
| 2002/0069172 A1 | 6/2002 | Omshehe et al. |
| 2002/0082997 A1 | 6/2002 | Kobata et al. |
| 2002/0152395 A1 | 10/2002 | Zhang et al. |
| 2002/0152401 A1 | 10/2002 | Zhang et al. |
| 2002/0161718 A1 | 10/2002 | Coley et al. |
| 2003/0037341 A1 | 2/2003 | Van Der Meulen |
| 2003/0046566 A1 | 3/2003 | Holopainen |
| 2003/0065918 A1 | 4/2003 | Willey |
| 2003/0084306 A1 | 5/2003 | Abburi et al. |
| 2003/0110241 A1 | 6/2003 | Cheng, Jr. et al. |
| 2003/0125975 A1 | 7/2003 | Danz et al. |
| 2003/0172035 A1 | 9/2003 | Cronce et al. |
| 2003/0200541 A1 | 10/2003 | Cheng et al. |
| 2003/0216973 A1 | 11/2003 | Walker et al. |
| 2004/0009815 A1 | 1/2004 | Zotto et al. |
| 2004/0024860 A1 | 2/2004 | Sato et al. |
| 2004/0030912 A1 | 2/2004 | Merkle et al. |
| 2004/0039916 A1 | 2/2004 | Aldis et al. |
| 2004/0059929 A1 | 3/2004 | Rodgers et al. |
| 2004/0059938 A1 | 3/2004 | Hughes et al. |
| 2004/0066417 A1 | 4/2004 | Anabuki et al. |
| 2004/0143746 A1 | 7/2004 | Ligeti et al. |
| 2004/0148525 A1 | 7/2004 | Aida et al. |
| 2004/0152516 A1 | 8/2004 | Blatter et al. |
| 2004/0177354 A1 | 9/2004 | Gunyakti et al. |
| 2004/0187018 A1 | 9/2004 | Owen et al. |
| 2004/0221169 A1 | 11/2004 | Lee et al. |
| 2004/0249763 A1 | 12/2004 | Vardi |
| 2005/0027657 A1 | 2/2005 | Leontiev et al. |
| 2005/0069129 A1 | 3/2005 | Ho et al. |
| 2005/0071280 A1 | 3/2005 | Irwin et al. |
| 2005/0076334 A1 | 4/2005 | Denemeyer |
| 2005/0108173 A1 | 5/2005 | Stefik et al. |
| 2005/0138155 A1 | 6/2005 | Lewis |
| 2005/0165693 A1 | 7/2005 | Morritzen et al. |
| 2005/0172280 A1 | 8/2005 | Ziegler et al. |
| 2005/0216743 A1 | 9/2005 | Peinado |
| 2005/0222967 A1 | 10/2005 | Adir |
| 2005/0262498 A1 | 11/2005 | Ferguson et al. |
| 2005/0278395 A1 | 12/2005 | Sandaire |
| 2005/0289072 A1 | 12/2005 | Sabharwal |
| 2006/0026105 A1* | 2/2006 | Endoh .................. G06F 21/10 705/59 |
| 2006/0048132 A1 | 3/2006 | Chen et al. |
| 2006/0048236 A1 | 3/2006 | Multerer et al. |
| 2006/0064756 A1 | 3/2006 | Ebert |
| 2006/0072444 A1 | 4/2006 | Engel et al. |
| 2006/0095454 A1 | 5/2006 | Shankar et al. |
| 2006/0161914 A1 | 7/2006 | Morrison et al. |
| 2006/0190403 A1 | 8/2006 | Lin et al. |
| 2006/0242081 A1 | 10/2006 | Ivanov et al. |
| 2006/0265337 A1 | 11/2006 | Wesinger, Jr. |
| 2006/0265758 A1 | 11/2006 | Khandelwal et al. |
| 2006/0272031 A1 | 11/2006 | Ache et al. |
| 2006/0282511 A1 | 12/2006 | Takano et al. |
| 2007/0107067 A1 | 5/2007 | Fountian |
| 2007/0143228 A1 | 6/2007 | Jorden et al. |
| 2007/0150418 A1 | 6/2007 | Ben-Menahem et al. |
| 2007/0168288 A1 | 7/2007 | Bozeman |
| 2007/0198422 A1 | 8/2007 | Prahlad et al. |
| 2007/0203846 A1 | 8/2007 | Kavuri et al. |
| 2007/0219917 A1 | 9/2007 | Liu et al. |
| 2007/0265950 A1 | 11/2007 | Reuss |
| 2007/0276916 A1 | 11/2007 | McLoughlin et al. |
| 2007/0282615 A1 | 12/2007 | Hamilton et al. |
| 2007/0300308 A1 | 12/2007 | Mishura |
| 2008/0065552 A1 | 3/2008 | Elazar et al. |
| 2008/0086423 A1 | 4/2008 | Waites |
| 2008/0141378 A1 | 6/2008 | McLean |
| 2008/0147556 A1 | 6/2008 | Smith et al. |
| 2008/0148067 A1 | 6/2008 | Sitrick et al. |
| 2008/0167946 A1 | 7/2008 | Bezos et al. |
| 2008/0172300 A1 | 7/2008 | Karki et al. |
| 2008/0228578 A1 | 9/2008 | Mashinsky |
| 2008/0244754 A1 | 10/2008 | Curren |
| 2008/0247731 A1 | 10/2008 | Yamauchi et al. |
| 2008/0250239 A1 | 10/2008 | Risan et al. |
| 2008/0289050 A1 | 11/2008 | Kawamoto et al. |
| 2008/0319779 A1 | 12/2008 | Hughes et al. |
| 2008/0320607 A1 | 12/2008 | Richardson |
| 2009/0037337 A1 | 2/2009 | Baitalmal et al. |
| 2009/0083730 A1 | 3/2009 | Richardson |
| 2009/0138643 A1 | 5/2009 | Charles et al. |
| 2009/0138975 A1 | 5/2009 | Richardson |
| 2009/0165080 A1 | 6/2009 | Fahn et al. |
| 2009/0228982 A1 | 9/2009 | Kobayashi et al. |
| 2009/0024984 A1 | 11/2009 | Maeda |
| 2009/0319779 A1 | 12/2009 | Thoursie et al. |
| 2010/0057703 A1 | 3/2010 | Brandt et al. |
| 2010/0293096 A1 | 11/2010 | Bussey |
| 2010/0293622 A1 | 11/2010 | Nikitin et al. |
| 2012/0130789 A1 | 5/2012 | Postrel |

FOREIGN PATENT DOCUMENTS

| | | |
|---|---|---|
| DE | 101 55 755 A1 | 5/2003 |
| EP | 1 096 406 | 5/2001 |
| EP | 1 560 098 | 8/2005 |
| EP | 1637958 | 3/2006 |
| EP | 1637961 | 3/2006 |
| EP | 1670188 | 6/2006 |
| JP | 4 369 068 | 12/1992 |
| WO | WO 1992/09160 | 5/1992 |
| WO | WO 92/20022 | 11/1992 |
| WO | WO 93/01550 | 1/1993 |
| WO | WO 95/35533 | 12/1995 |
| WO | WO 1998/042098 | 9/1998 |
| WO | WO 00/67095 | 11/2000 |
| WO | WO 2000/072119 | 11/2000 |
| WO | WO 2005/104686 | 11/2005 |
| WO | WO 2007/060516 | 5/2007 |
| WO | WO 2008/013504 | 1/2008 |
| WO | WO 2008/157639 | 12/2008 |
| WO | WO 2009/039504 | 3/2009 |
| WO | WO 2009/065135 | 5/2009 |
| WO | WO 2009/076232 | 6/2009 |
| WO | WO 2009/105702 | 8/2009 |
| WO | WO 2009/143115 | 11/2009 |
| WO | WO 2009/158525 | 12/2009 |
| WO | WO 2010/093683 | 8/2010 |

OTHER PUBLICATIONS

Corcoran et al., "Techniques for Securing Multimedia Content in Consumer Electronic Appliances using Biometrics Signatures," *Transactions on Consumer Electronics*, vol. 51, No. 2, pp. 545-551, Mar. 2005.

Microsoft Corporation, "Operations Guide: Microsoft Systems Management Server 2003," 2003, Internet Citation retrieved on Jun. 27, 2007. XP 002439673.

Rivest, R. "RFC 1321—The MD5 Message Digest Algorithm," Apr. 1992, Retrieved from the Internet on Jul. 21, 2005.

Ye, Ruopeng, "Authenticated Software Update," *A Dissertation Submitted to the College of Computer and Information Science of Northeastern University in Partial Fulfillment of the Requirements for the Degree of Doctor of Philosophy in Computer Science*, Apr. 28, 2008.

(56) References Cited

OTHER PUBLICATIONS

Wikberg, Michael, "Software License Management from System-Integrator Viewpoint," Master's Thesis for a Degree for Computer Science and Engineering, School of Science and Technology, Aalto University, Helsinki, Apr. 30, 2010.
Williams, R., "A Painless Guide to CRC Error Detection Algorithms", Ver. 3, Aug. 19, 1993.
Angha, F. et al., "Securing Transportation Network Infrastructure with Patented Technology of Device Locking—Developed by Uniloc USA", avail. at: http://www.dksassociates.com/admin/paperfile/ITS%20World%20Paper%20Submission_Uniloc%20_2_.pdf, Oct. 24, 2006.
Econolite, "Econolite and Uniloc Partner to Bring Unmatched Infrastructure Security to Advanced Traffic Control Networks with Launch of Strongpoint", avail. at: http://www.econolite.com/docs/press/20080304_Econolite_StrongPoint.pdf, Mar. 4, 2008.
Acid 2.0 User Manual, Sep. 2009.
"Technical Details on Microsoft Product Activation for Windows XP," Internet Citation, XP002398930, Aug. 13, 2001.
"How Microsoft Product Activation (WPA) Works in Windows XP and Windows Vista," *PCBUYERBEWARE*, retrieved from the Internet on May 10, 2008. XP002613942.
Lallous, "Changing Volume's Serial Number," Code Project Feb. 17, 2008, retreived from the internet on Dec. 14, 2010. XP002614149.
Wikipedia: "Windows Product Activation," dated May 10, 2008 Internet Article retrieved from the internet on Dec. 10, 2010, [XP002613941].
Wikipedia: "Software Extension," May 28, 2009, Internet Article retrieved on Oct. 11, 2010. XP002604710.
Williams et al., "Web Database Applications with PHP & MySQL," O'Reilly Media Chapter 1. Database Applications and the Web Mar. 2002, Internet Article retrieved on Sep. 21, 2010. XP002603488.

\* cited by examiner

MODULAR SOFTWARE PROTECTION

This application is a divisional of U.S. application Ser. No. 12/784,380, filed May 20, 2010, which claims priority to U.S. Provisional Application No. 61/218,558, filed Jun. 19, 2009, both of which are applications fully incorporated herein by reference. The benefit of such earlier filing dates is hereby claimed by applicant under 35 U.S.C. § 120.

BACKGROUND

Field of the Invention

The present disclosure relates to methods and systems for protecting electronic content, such as software or other executable content, from unauthorized use or access in violation of license terms.

Description of the Related Art

Various methods and systems exist for enforcement of electronic content license terms, and other management of digital rights, often called Digital Rights Management (DRM). Various DRM technologies are in use today, depending on different factors such as the content source and type of content being protected. Despite the advantages of existing DRM technology, there remain opportunities to provide improvements, including but not limited to improving the security of systems that rely on the use of hardware identification, sometimes called "hardware fingerprinting," and increasing the flexibility of DRM in its application to specific installations.

Some electronic content, for example, software, is designed to be installed and used on one or more client devices. It is generally desirable to encourage copying and distribution of software to increase the installed user base as much as possible. At the same time, it may be desirable to prevent the user base from using at least certain features of the installed content without obtaining a license from the software provider or distributor. In addition, it may be desirable to control the number of client machines on which a particular licensed copy may be installed and used with its features enabled. It is desirable to provide these and other capabilities in a robust and secure system for preventing unauthorized use of installed executable content.

SUMMARY OF THE INVENTION

The present technology uses a hardware fingerprint in a DRM system to separately protect defined features or modules of an executable program installed on a programmable client device. The system utilizes at least one server in communication with one or more clients via a communications network. The server responds to data transmitted from each client on which a copy of a protected executable is installed, and processes the data to determine a license status for the installed executable on the client on which it is installed. The data from the client includes a hardware fingerprint determined at the client machine and a license key identifier. The license key identifier is registered at the server prior to activation of the protected executable, and identifies to the server a particular customer's usage rights in the executable, such as, for example, a number of clients the executable is permitted to be used on and rights to different features or functions that the executable is capable of performing. These use rights may be maintained in a database record related to the key identifier that is accessible to the server.

If the license key is recognized by the server as a valid key, the server may check to determine whether use of the executable on the client complies with numeric restrictions limiting the number of computers that the executable may be used on. The server may use the hardware fingerprint received from the client to compare with past fingerprints received from prior activations on other clients, and thereby determine that the activation is new and not a re-activation or re-installation. The server may maintain a count of unique machines on which the executable has been activated, or a database recording the hardware fingerprints associated with each particular license key. From this information, the server may determine the number of different machines on which the executable has been installed.

If the server determines that use of the executable on the client identified by the hardware fingerprint complies with terms associated with the license, the server may create an encrypted file, for example, a public-key encrypted license file. The server may create and encrypt the file using a public key algorithm so that it describes the features or functions of the executable that are allowed to operate on the client. The server may then transmit the encrypted file to the client, with the public key made available to the client using a Public-Key Infrastructure (PKI). In the alternative, the license file may be encrypted using a symmetric private key, which may comprise, for example, the hardware fingerprint of the client machine.

The client receives and stores the encrypted license file. When the protected software is executed, the software executable decrypts and reads the license file that specifies which elements of the software are allowed to operate on the client device. The file may be decrypted using a public key obtained through a PKI, or a private key determinable from the hardware fingerprint or other information available to the client and server. The rules specified in the license file may be enforced on the client using any suitable anti-piracy method. For example, confirmation may be required by the client from the server during operation of the software, which if not received disables the element in question.

The technology may further include a novel method and system for determining a hardware fingerprint, which may be used to determine a hardware fingerprint determined for the client in the method and system summarized above. The fingerprinting method is not limited to this application, however, and may be applied to any circumstance in which it is desired to exchange a hardware fingerprint between two machines. The resulting fingerprint has a high probability of being unique to the machine from which it is generated, like prior art machine fingerprints. However, unlike prior art fingerprints, the fingerprint is generated by applying a data template supplied from a server in a finger-printing operation performed on the client. Without this data template, the fingerprint cannot be generated on the client device.

To generate the fingerprint, the client device first reads local system component parameter information according to a predefined algorithm to generate a data file. The parameters checked to generate the fingerprint may include, for example, hard disk volume name, computer name, hard disc initialization date, amount of installed memory, type of processor, software or operating system serial number, or unique parameters associated with firmware installed in the client device. In general, the collected parameter information should be of a time-stable or static nature for the client. The resulting data file, also referred to herein as "gross fingerprint data," may be stored in a file in a memory of the client. It may be advantageous to store the file in a transient file only, such as in a random-access memory (RAM) device, so that no record of the file remains after the fingerprint is generated. The stored data file comprises parameter data arranged in a defined order of data fields or records. Each data field may be of a known length, which may vary for each field. The gross fingerprint data file may be encrypted, secured or obfuscated using any suitable method.

In some embodiments, the client may transmit the entire gross fingerprint data file to a trusted server when it is first generated. In other embodiments, the gross fingerprint data is never provided in its entirety to another device.

The client may then request information from a trusted source for defining a sampling protocol, i.e., the data template, for deriving a working fingerprint from the gross fingerprint data. The sample-defining template may comprise information defining a filter or other transformation to be applied to the original fingerprint data file to generate a device fingerprint. In some embodiments, the template defines a map for selecting designated portions of the fingerprint data file. For example, the template may specify one or more bytes of data, but less than all data, be selected from each data field in a particular order or position. The client processes the gross fingerprint data using the sample-defining template to generate a resulting working machine fingerprint, which may be stored in a local buffering system. The client, the source of the sample-defining template, or both may store the sample-defining information in a secure file for future reference, optionally first encrypting it.

The client may then provide the working machine fingerprint to any other device that needs the fingerprint to identify or authenticate the client device. In some embodiments, a trusted server maintains a record of the entire gross fingerprint data for the client, while the sample-defining template used to generate a working machine fingerprint is discarded after each use. The server may generate the sample-defining template and confirm that the machine fingerprint generated by the client is consistent with both the gross fingerprint data and with the sample-defining template. By specifying different sample-defining template at different times, the server may thereby authenticate the client without requiring the client to transmit the entirety of the gross fingerprint data for each authentication instance. Instead, the gross fingerprint data may provided from the client to the server during a single initialization session, which may be initiated and secured by the server using appropriate security tools, if it is transmitted at all. Subsequent sessions need not be as secure because the entirety of the gross fingerprint data is not retransmitted. The utility of the client's machine fingerprint for authentication of device identity is thereby maintained in a more secure form.

A more complete understanding of modular software protection will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

Throughout the several figures and in the specification that follows, like element numerals are used to indicate like elements appearing in one or more of the figures.

DETAILED DESCRIPTION

The present technology provides modular software protection by controlling operation of software on client devices to comply with terms of the applicable software license, enabling specific features of installed software. In addition, there are disclosed herein systems and methods for identifying a client computing device for use with the modular software protection, and in other applications.

Figure 1:
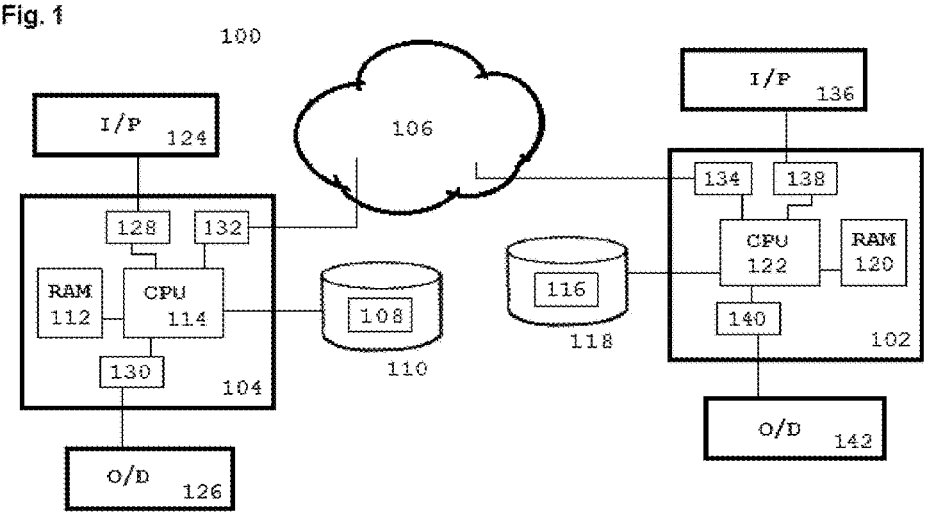
FIG. 1 is a schematic diagram showing elements of a system for performing modular software protection.

FIG. 1 shows a system 100 including a server 102 and a client device 104 in communication via a communications network 106. Communications network 106 may comprise the Internet, a cellular communications network, a satellite communications network, a local area network, or some combination of these or other suitable networks. The client device may be configured with a software executable file or files 108 encoded in a computer-readable media of a data storage device 110. When loaded into the client memory 112 and subsequently into the client processor 114, the executable file or files causes the client device to perform the client-side processes and outputs as described in more detail herein. Examples of suitable devices for use as client device 104 include personal computers, programmable communications devices such as mobile telephones and media players, "netbooks," and other programmable devices.

Likewise, the server 102 may be configured with a server-side application file or files 116 encoded in a computer-readable media of a data storage device 118. When loaded into the server memory 120 and subsequently into the server processor 122, the executable file or files causes the client device to perform the server-side processes and outputs as described in more detail herein. File or files 108 and 116 may be developed by writing programming code in any suitable programming language to perform the actions and provide the outputs consistent with the disclosure herein, and compiling the code to provide machine-executable code. Like the client device 104, the server 102 may comprise any one of various suitable programmable computing devices. In the alternative, server 102 may comprise a coordinated assembly of such computing devices, for example, a server farm.

Generally, both the server 102 and the client 104 may be configured as input-transforming machines, the very purpose of which is to receive physical input from at least one client-side user input device 124 and provide a responsive physical output via a client-side output device 126, such as an audio-video output. Input device 124 may comprise various devices, for example, a keyboard, mouse, microphone, or other physical transducer connected to client 104 and configured to transform physical input from a user into a data signal, which may be routed through an interface device 128 and provided as input to processor 114. The processor 114, operating an executable as described herein, responds to the input signal and provides output data through a video interface 130 to a display device 126. The processor 114 may further receive input data from the server 102 or provide output to the server via network interface 132 and communications network 106.

Conversely, server 102 may receive input data from the client 104 or provide output to the client via network interface 134 and communications network 106. Optionally, server 102 may comprise an input device 136 in communication with the processor 120 via an interface 138, and provide output via a video processor 140 to a display device 142.

Figure 2:
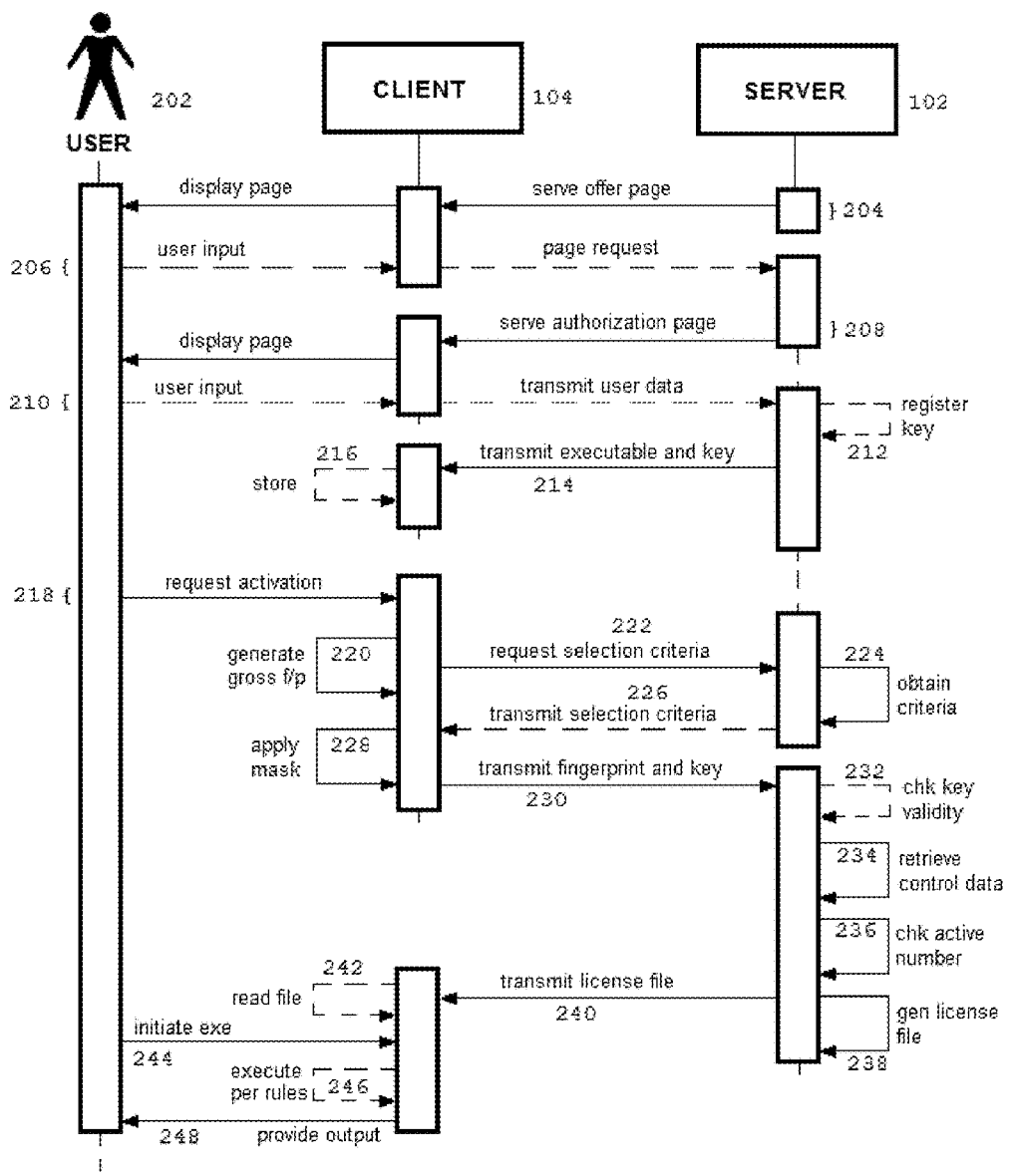
FIG. 2 is a sequence diagram showing process elements for modular software protection across different system components.

FIG. 2 exemplifies both responsive and independent actions of a client 104 operating in cooperation with a server 102 to receive input from a user 202 and provide responsive output to the user. By way of background, a software executable installed, or to be installed, on client 104 is capable of performing functions desired by the user. The software executable may be installed by copying to the client from a portable computer-readable media read by a client component or peripheral device in communication with the client. However, FIG. 2 diagrams an alternative method via a network download, in which the server 102 initiates serving 204 a web page or other data object to the client 104, which displays the page or object to the user. For example, the server may send an advertisement for the software to the client. The web page or other object may include a responsive object, such as a link or input object, through which user input may be transformed into a data request at the client, for example, a hyperlink or applet object. The client 104 may receive user input 206 and thereby generate a page or data request to the server 102.

The page request on line 206 may signify a user's interest in licensing use of the software executable or at least one feature or function thereof. In response, the server may select an appropriate object for transacting a license with the user, for example an authorization page requesting user data such as name, address, phone number, and credit card or other payment information. Such a page may be configured for the input of data through a form or other object included in the page. The server 102 may transmit the authorization page 208 to the client, which displays it to the user.

The user may therefore provide all the necessary user data by input 210 to the client 104, which receives the input and transmits it to the server 102. In response, the server may generate and register a license key associated with the user data received from client 104. A license key may consist of any data identifier, for example, a string of binary data encoding a character string. The key may include randomly-selected characters or other data, should be sufficiently complex so that it is practically undiscoverable by iterative guessing or "brute force" algorithms and should be uniquely assigned to the user data and software executable with which it is associated.

The server may register the key 212 by storing it in a secure database in association with an identifier for the software executable and the user data. The server may then transmit 214 the software executable and the license key to the client 104. Optionally, the license key and software executable may be encrypted using any suitable public-key algorithm before transmitting. Also optionally, the license key may be inserted in some hidden location of the software executable so that its presence is not readily detected by any person or machine not informed of its hidden location in the file. The client may store 216 the software executable in a memory or storage medium, optionally first decrypting it. The software executable may comprise any non-zero number of executable and data files.

Processes corresponding to those described for network distribution may be performed for distributing the software executable on a tangible medium, for example, on an optical disk or memory device. In such cases, user data may be collected at the point of sale of the tangible medium, or when the executable is installed from the medium onto a client storage device. The license key may be generated before the executable is distributed and encoded with the executable on the tangible medium. It may therefore also be registered to the user at the time the user data is received, either at the point of sale, time of installation, or some other time.

The installed executable and license key may reside on the client indefinitely until user input requesting activation is received by the client. Receipt of an activation request may be used as a trigger for generating a gross machine fingerprint 220 at the client device. The software executable may be used as the application to perform the fingerprinting actions at the client. For example, when the software is installed, it may be installed with modules for performing the fingerprinting function as described herein, before other functional aspects of the software can be unlocked. In the alternative, the fingerprinting function may be performed by a separate application, for example, a distributable application pushed to the client 104 by server 102 with the executable, or at some other time.

Methods for generating a gross machine fingerprint are described later in the specification. "Gross" is used with "fingerprint" herein to signify a set of identification data from which a smaller set of data may be extracted to provide a modular or "selected" set of fingerprint data. "Fingerprint data" is described more detail below, and signifies data that is characteristic of hardware or firmware belonging to the client device, collected and assembled to have a very high probability (e.g., greater than 99.999%) of being unique to the client. The client may maintain the gross fingerprint data in a temporary memory or client buffer, as a temporary file having a defined data structure. In the alternative, or in addition, the client may store the gross fingerprint data in a memory storage device or transmit it to the server. Either of these alternatives, however, may increase the risk of the gross fingerprint data being taken and used to circumvent the protective measures disclosed herein. Conversely, such risks may be reduced by encrypting, obfuscated or otherwise securing the gross fingerprint data using any suitable method.

Optionally, the client may request selection criteria, also called a selection mask or template, from the server 222. In response to or in anticipation of the client request, the server may obtain the selection criteria 224. The server may retrieve a stored selection mask having parameters defined for gross fingerprint data having a predetermined data structure. In the alternative, or in addition, the server may generate a selection mask in response to receiving data describing the data structure of the gross fingerprint. A key characteristic of the selection mask is a designation of less than 100% of the data contained in the gross fingerprint file, for example, 5%, 10%, or some other percentage within the range of about 0.1% to 99%, and more typically about 5% to 50%. The selection mask also defines locations within the gross fingerprint file from which the designation portion of selected data is to be selected. For example, the selection mask may specify selecting the first and third data bytes from a first field of the data structure, the third and fourth bytes from the second field, and so forth. Further details and examples of selection masks are described later in the specification.

The server transmits the defined selection mask to the client 226. The client applies the mask to the gross fingerprint data to generate a selected machine fingerprint. The machine fingerprint may be determined by an irreversible function of the gross fingerprint data and the selection mask, such that the selection mask and machine fingerprint cannot be used to determine the gross machine fingerprint. The irreversible function comprises selecting data from the gross fingerprint data as specified by the selection criteria to create a second fingerprint file from which a substantial portion of the gross fingerprint data is omitted. The irreversible function may further comprise encrypting the second file using an irreversible cryptographic hash.

The client transmits the machine fingerprint and license key to the server 230. The machine fingerprint and license key may be configured as two or more separate files. In the alternative, they may be combined in a single file. Optionally, the client may encrypt the one or more files before transmitting to the server. After transmitting the machine fingerprint, the client may delete the gross fingerprint data and/or the machine fingerprint from any local memory. In the alternative, the client may store the gross fingerprint data and/or the machine fingerprint in a local non-volatile memory or storage device accessible to the client.

The server receives the machine fingerprint and key, decrypting them if necessary. In response, the server checks the validity of the license key 232. The server may check the validity by querying a registration database containing records of valid keys. If the query returns a match to the license key, the license key may be deemed validated by the server. In addition, the query may be used to obtain user data associated with the registered key, for example, user name and address, which may be compared to user data received from the client. The server may require a match between user data received from the database and that received from the client as a condition of determining that the license key is valid. If the server cannot validate the key, it may return a failure message to the client (not shown). Validation failure should prevent operation of the licensed features of the software executable on the client. It may in addition trigger other actions that are not the focus of the present disclosure.

If the server is able to validate the license key, it may retrieve control data 234 indicated by the license key. Control data may comprise a file or data record defining, in a computer-readable format, usage rights, restrictions, limitations, or permissions associated with the license key received from the client. The control data may be generated at the time the software is licensed and maintained in a database accessible to the server, indexed by the unique license key assigned to the particular licensed copy of the software executable. In addition, the control data may be updated from time to time after initial licensing. For example, in a software executable comprising a computer game, additional levels of play, characters, or digital game items may be licensed or earned via game play after initial installation.

The server may perform an additional function of checking 236 the number of client devices on which copies identified by the license key have been installed and not subsequently disabled. Software providers often desire to limit operating of a licensed copy to a designated number of client devices. The designated number may be selected low enough to prevent widespread copyright abuse, but high enough to satisfy consumers that may desire to operate the software on more than one client device. To perform the checking 236 function, the server makes use of the machine fingerprint provided from the client. To do this, the server may save the machine fingerprint in a database associated with the license key, and also query the database to identify other records containing the same key in association with a different or distinct machine fingerprint. Each record returned may be counted as an installed instance of the software executable on a different machine. The server may then compare the counted records with the number of instances permitted, as specified by the control data. If the count exceeds the permitted number of instances, a failure message may be transmitted to the client as outlined above.

If the count does not exceed the permitted number of instances specified by the control data, the server may generate a license file incorporating the control data. The license file should include information describing features or aspects of the software executable that should be enabled on the client identified by the machine fingerprint. The server may encrypt the license file using a public/private encryption scheme. The server may use a PKI encryption scheme to certify the server to the client. The server may transmit the license file 240 to the client.

The client may read the license file 242 using the protected executable. More exactly, the client may write the license file to a secure location, for example, in a predetermined directory where the software executable is programmed to find it. The client may store the license file in an encrypted form.

The client may execute the software executable in response to input 244 requesting execution. The software executable may be configured such that, when operated, the client attempts to read the license file from the designated location, and if necessary, decrypts it. If the license file cannot be read and decrypted, the client may output a failure message and/or treat the failure as a request for activation 218. Conversely, if the client can read and decrypt the license file via operation of the software executable, the software executable may be enabled to perform 246 all of the functions enabled by the license file. In the alternative, the software executable may be enabled to perform some additional action to verify the validity of the license file, for example, communicating with the server, to confirm that the license file is valid. After receiving confirmation the executable may perform all of the functions enabled by the license file.

Figure 3:
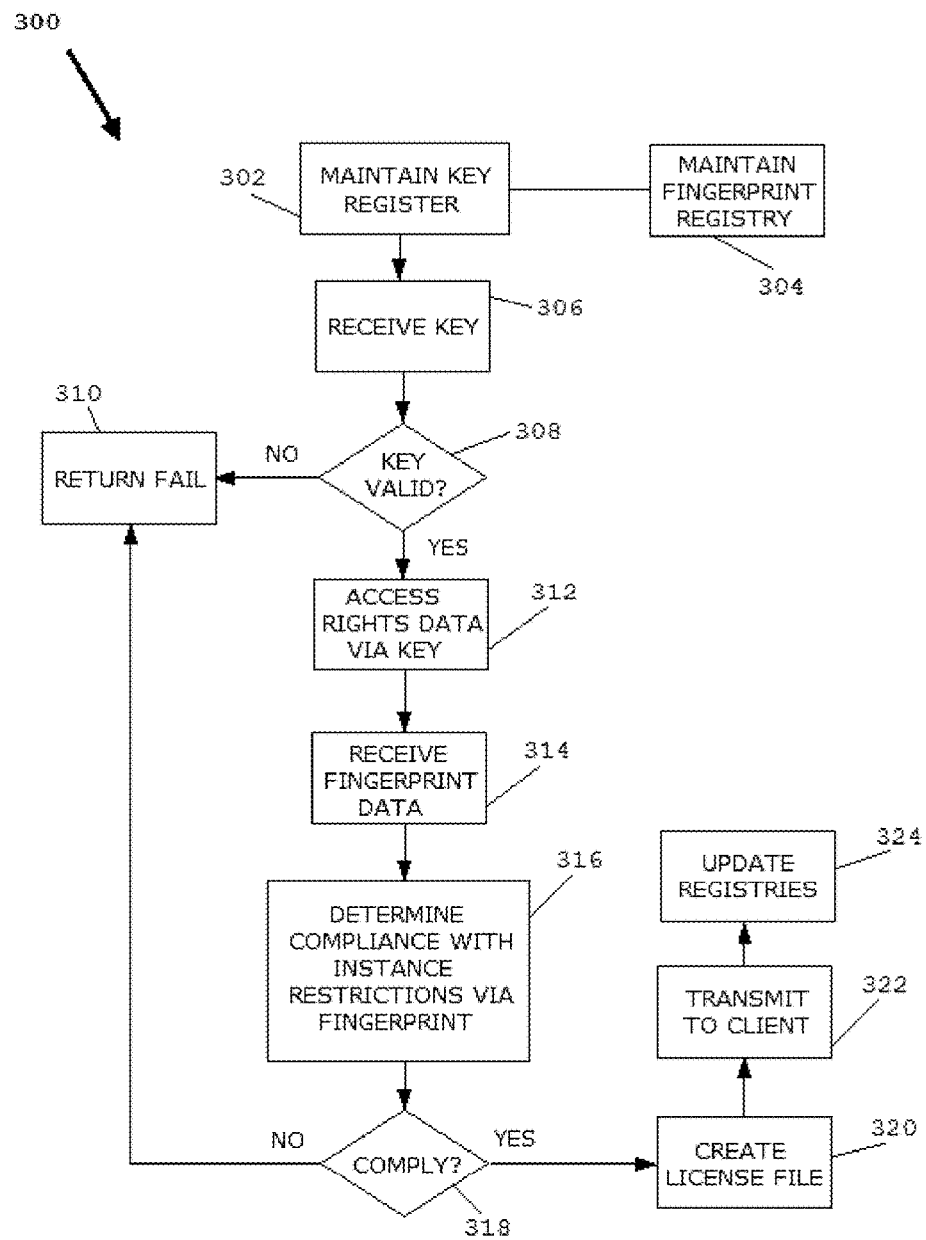
FIG. 3 is a flow chart showing a process of modular software protection performed by a server in cooperation with a client.
Figure 4:
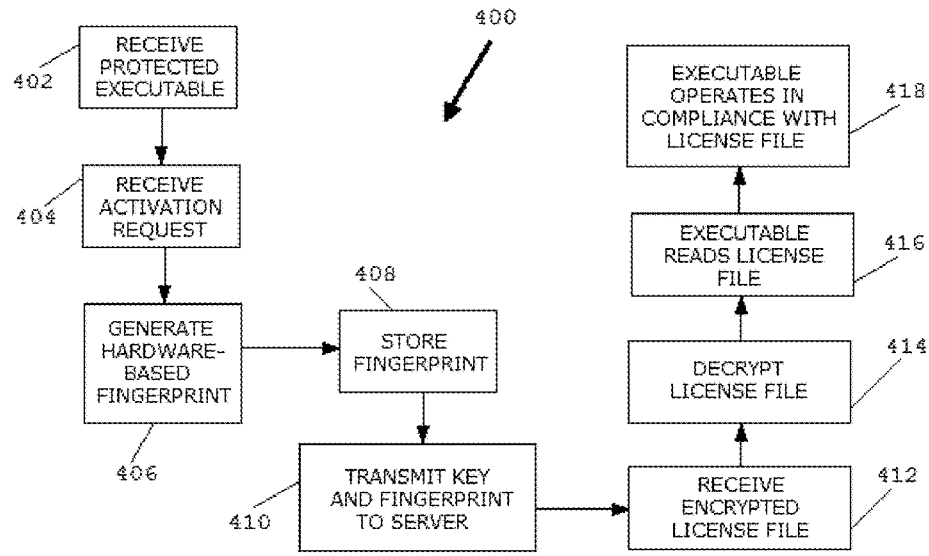
FIG. 4 is a flow chart showing a process of modular software protection performed by a client in cooperation with a server.

FIG. 2 diagrams the interaction between a server, client, and user. FIGS. 3 and 4 show how the server and client, respectively, perform methods consistent with the interactions diagrammed in FIG. 2.

Referring to FIG. 3, a method 300 is shown for implementation on a server. The server may maintain a key registry 302 and a machine fingerprint registry 304, databases or a database accessible to the server and responsive to input and queries from the server. The key registry may hold assigned license keys for distributed software, in association with user data. This data may be collected at the time of initial licensing and updated as needed. The key registry may also contain or link to license control data for each key, specifying the rights and restrictions applicable to each licensed copy, including specifying particular features to be enabled or disabled. The key registry exemplifies a means for recording license rights and enabled features associated with a particular license key.

The fingerprint registry 304 may hold machine fingerprint records in association with one or more license keys for software registered with or operated on clients from which the respective fingerprints are received. The fingerprint registry functions as a means for recording the installation and/or use of distributed software executables, in contrast to the key registry which functions to record user license rights and enabled features for the software executables. These two registries merely exemplify useful data structures for use with the disclosed method, and other means for registering or tracking the information discussed above may also be useful.

With these registries or equivalent functional capacity in place, the server may receive 306 a license key as data transmitted though a computer or communications network and network interface to the server processor. The processor and network interface, programmed using one or more applications to communicate data over the network and recognize a license key, may comprise a means for receiving the key. The server may test 308 the validity of the key using any suitable method, one of which is to use the key to query the license registry, and to compare user data from the registry with user data received from the client. In the alternative, an algorithm programmed in software running on the server may test whether the key complies with required data characteristics of a license key, without reference to a database. A processor programmed to query a database and compare query results or otherwise process license key data to check validity may comprise a means for verifying validity of the license key.

If the server cannot validate the license key, the server may generate and transmit a failure message 310 to the client. In addition, the server may record the validation failure for future diagnostic or other reference. If the server is able to validate the license key, the server may read or otherwise access 3120 the rights or control data associated with the license key, for example by processing one or more data fields in a data record associated with the license key. A processor programmed to query a database and determine the value of one or more data fields in a data record may comprise a means for accessing the rights data. The control data may include an identification of enable or disabled software features and a permitted number of concurrent installations or executions.

The server makes use of a machine fingerprint and the control data to determine whether or not to provide an enabling license file to the client. The server may receive 314 the machine fingerprint data from the client at any time prior to making this determination. So far as the server is concerned, the machine fingerprint may comprise any data that uniquely identifies the client machine as a physical unit, and not merely as holding some identification data previously supplied by the server to the client. In other words, the machine fingerprint should not be confused with a cookie identifier, which comprises data originating from a server and stored on the client. In some embodiments, the machine fingerprint is developed by interaction between the server and the client, as described more fully in connection with FIGS. 5-8 below. In other embodiments, the fingerprint may be independently generated at the client by operation of the software executable to which the license key is assigned. The processor and network interface, programmed using one or more applications to communicate data over the network and recognize a machine fingerprint, may comprise a means for receiving the fingerprint data.

With the rights data accessed at 312 and the fingerprint data received at 314, the server possesses the information needed to determine, at 316, compliance with instance restrictions. This determination may be performed using a programmed logic to determine a number of existing installations using the fingerprint registry, and to compare this number to a number of permitted installations specified by the control data. A processor programmed to query a database, count a number of records returned and perform a conditional operation based on results of a number comparison may comprise a means for determining compliance with the instance restrictions. If the instance restrictions are not complied with 318, a failure condition 310 as previously discussed may result.

If the instance restrictions are complied with 318, the server may generate and encrypt a license file 320. The license file should be written in machine-readable code for the software executable with which the license key is associated, and may contain one or more data items serving as variables indicating enablement or disablement status of different features of the software executable. Accordingly, an application on the server should be programmed to provide the data items arranged and formatted so as to be readable by the software executable. The application may be programmed according to a pre-determined format for the software executable. In the alternative, or in addition, the application may be programmed to query a database or date service to obtain updated configuration information, before creating the license file. The server may encrypt the license file using a public/private encryption method, optionally using PKI certification for the server source. A processor programmed with an application for performing the described operations may comprise a means for creating the license file.

The server may transmit the license file to the client 322, using any suitable communications method. A processor and network interface programmed with an application for directing data to a client from which the license key and machine fingerprint were received may comprise a means for transmitting the license file to the client.

After transmitting the license file, or at any other suitable time, the server may update the fingerprint registry with the received machine fingerprint and associated license key. If the client has provided any updated user data this may be updated in the key registry as well.

FIG. 4 shows a method 400 for implementation on a client, for use in cooperation with server-based method 300. It should not escape the reader that the diagrammed actions performed by the client may be programmed into a unified application or software executable installed on the client, wherein the software executable comprises the asset to be protected. Accordingly, the software executable may comprise two separate portions: a first portion configured for causing the client device to perform the described actions, and a second portion configured to provide the features that are the subject of control and protection via the license file. For example, the second portion may comprise a computer game, a word processor, a spreadsheet, a media player, a browser, a database interface, a graphics editor, or any other useful application. The software executable may include any non-zero number of files.

At 402, the client receives the software executable via any suitable pathway. Via network download as described in connection with FIG. 2 comprises one suitable pathway. By loading from a portable medium, such as an optical disk, or memory device comprises another. A processor and network interface for receiving and recognizing the software executable may comprise a means for receiving the software executable. A media reader coupled to the processor may also comprise a means for receiving the software executable. After receiving the software executable, the client may store it in a file system.

The software executable may lie stored and dormant until the client receives an activation request 404. Often this request is received soon after installation, being prompted by an application used for installing the target executable. However, it may also be delayed. The request may be received as a user input signal responsive to output generated by the client, for example, selection of a button or icon using a pointing device, or numerous other potential inputs. Receipt 404 of the request may trigger generation of a hardware-based machine fingerprint 406.

At least one application, including but not limited to the software executable, running on the client computing device or otherwise accessing the computing device's hardware and file system may generate a machine fingerprint. The application may prepare a gross fingerprint and select from a portion of that machine fingerprint for providing to the server. In the alternative, the client may prepare a gross fingerprint for use in its entirety as a machine fingerprint for providing to the server. In either case, the application may generate the gross fingerprint data using a process that operates on data indicative of the client's configuration and hardware. The gross fingerprint data may be generated using, user-configurable machine parameters, non-user-configurable machine parameters, or both as input to a process that generates a gross fingerprint data file as binary data.

Each machine parameter indicates a state or identifier for a hardware component, software component, or data component of the client. To obtain stable gross fingerprint data, relatively stable or static machine parameters should be selected. The machine parameters may be selected such that the resulting gross fingerprint data has a very high probability (e.g., greater than 99.999%) of being unique to the client. In addition, the machine parameters may be selected such that the gross fingerprint data includes at least a stable unique portion up to and including the entire identifier that has a very high probability of remaining unchanged during normal operation of the client. The resulting gross fingerprint data should be highly specific, unique, reproducible and stable as a result of properly selecting the machine parameters.

Figure 5:
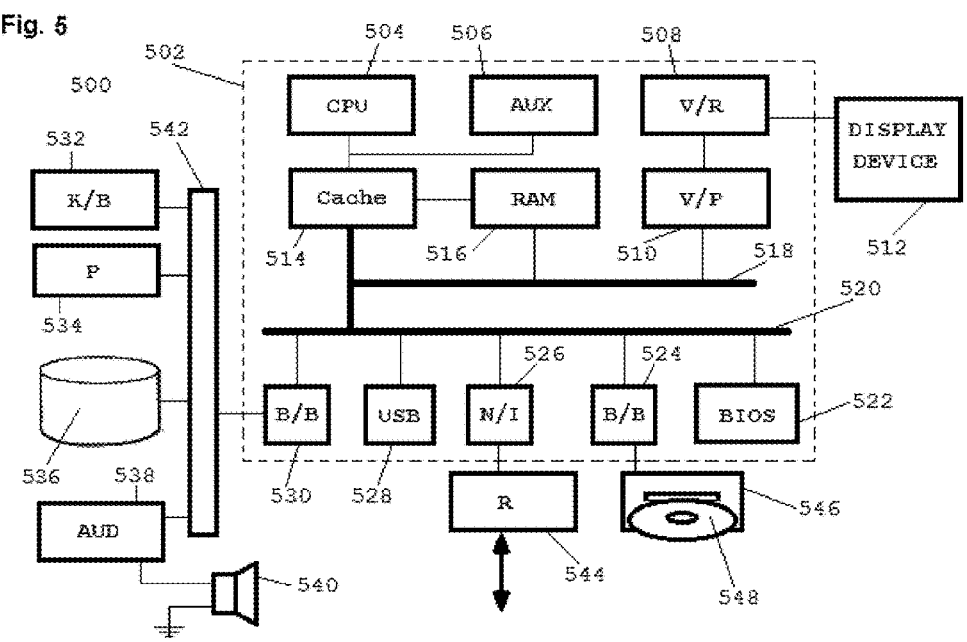
FIG. 5 is a system diagram showing elements of a client and its components for generating a modular machine fingerprint.

An example of a client device 500 comprising multiple components that may provide input for a gross fingerprint is shown in FIG. 5. Client 500 is depicted by way of example only, and does not limit the configuration of a client device on which hardware fingerprinting may usefully be performed. Client 500 may comprise a motherboard 502 on which reside a CPU 504 and one or more auxiliary processors 506. The CPU may comprise a cache memory 514 in communication with a random access memory (RAM) 516. A video processor 510 may communicate with these components via Northbridge hub 518 and provide video data through video RAM 508 to a display device 512.

Other components may communicate with the CPU 504 via a Southbridge hub 520, such as, for example a BIOS read-only memory or flash memory device 522, one or more bus bridges 524, 530, a network interface device 526, and a serial port 528. Each of these and other components may be characterized by some data or parameter settings that may be collected using the CPU 504 and used to characterize the client device 500. In addition, the client may be connected to various peripheral devices. For example, client 500 may be connected to a keyboard 532, a pointing device 534, a data storage device 536, and an audio output device 538 for transforming a data signal into analog audio output for a speaker 540 or amplifier (not shown). Other peripheral devices may include a router 544 connected via network interface 526 and providing connectivity to the Internet or other network, which may comprise a means for receiving applications or data from a server, or communicating with a server. Some clients may also include a media reader 546 for portable media 548, which may comprise a means for receiving an application capable of performing methods and processes disclosed herein.

Although client device 500 is shown with components as may often be found in personal computers, the technology disclosed herein may also be implemented on more highly integrated portable clients having programmable processors, memories and means for communicating with a server. Such clients also have components with non-user-configurable settings that may be used in compiling a device fingerprint. Examples of integrated portable clients include application-capable mobile phones, media players, personal organizers, and netbooks.

Referring again to FIG. 4, to generate the fingerprint 406, the application may operate by performing a system scan to determine a present configuration of the computing device. The application may then select the machine parameters to be used as input for generating the unique gross fingerprint data. Selection of parameters may vary depending on the system configuration. Once the parameters are selected, the application may generate the identifier.

Illustrative examples of various machine parameters that may be accessible to an application or applications running on or interacting with a processor of the client machine include: machine model; machine serial number; machine copyright; machine ROM version; machine bus speed; machine details; machine manufacturer; machine ROM release date; machine ROM size; machine UUID; and machine service tag. For further example, these machine parameters may include: CPU ID; CPU model; CPU details; CPU actual speed; CPU family; CPU manufacturer; CPU voltage; and CPU external clock; memory model; memory slots; memory total; and memory details; video card or component model; video card or component details; display model; display details; audio model; and audio details; network model; network address; Bluetooth address; BlackBox model; BlackBox serial; BlackBox details; BlackBox damage map; BlackBox volume name; NetStore details; and NetStore volume name; optical drive model; optical drive serial; optical details; keyboard model; keyboard details; mouse model; mouse details; printer details; and scanner details; baseboard manufacturer; baseboard product name; baseboard version; baseboard serial number; and baseboard asset tag; chassis manufacturer; chassis type; chassis version; and chassis serial number; IDE controller; SATA controller; RAID controller; and SCSI controller; port connector designator; port connector type; port connector port type; and system slot type; cache level; cache size; cache max size; cache SRAM type; and cache error correction type; fan; PCMCIA; modem; portable battery; tape drive; USB controller; and USB hub; device model; device model IMEI; device model IMSI; and device model LCD; wireless 802.11; webcam; game controller; silicone serial; and PCI controller; machine model, processor model, processor details, processor speed, memory model, memory total, network model of each Ethernet interface, network MAC address of each Ethernet interface, BlackBox Model, BlackBox Serial (e.g., using Dallas Silicone Serial DS-2401 chipset or the like), OS install date, nonce value, and nonce time of day. The foregoing examples are merely illustrative, and any suitable machine parameters may be used.

Because many client devices are mass-produced, using hardware parameters limited to the client box may not always provide the desired level of assurance that a gross fingerprint is unique to the client device. Use of user-configurable parameters may ameliorate this risk considerably, but at the cost of less stability. In addition, sampling of physical, non-user configurable properties for use as parameter input may also lessen the risk of generating duplicate fingerprint data. Physical device parameters available for sampling may include, for example, unique manufacturer characteristics, carbon and silicone degradation and small device failures.

Measuring carbon and silicone degradation may be accomplished, for example, by measuring a processor chip's performance in processing complex mathematical computations, or its speed in response to intensive time variable computations. These measurements depend in part on the speed with which electricity travels through the semi-conductor material from which the processor is fabricated. Using variable offsets to compensate for factors such as heat and additional stresses placed on a chip during the sampling process may allow measurements at different times to reproduce the expected values within a designated degree of precision. Over the lifetime of the processor, however, such measurements may change due to gradual degradation of the semi-conductor material. Recalibration or rewriting the gross fingerprint data may be used to compensate for such changes.

In addition to the chip benchmarking and degradation measurements, the process for generating a gross fingerprint data may include measuring physical, non-user-configurable characteristics of disk drives and solid state memory devices. For example, each data storage device may have damaged or unusable data sectors that are specific to each physical unit. A damaged or unusable sector generally remains so, and therefore a map of damaged sectors at a particular point in time may be used to identify a specific hardware device later in time. Data of this nature may also be included in a gross fingerprint file.

The application may read parameters from operating system data files or other data stored on the client, or actively obtain the parameters by querying one of more hardware components in communication with a processor on which the application is operating. A client processor provided with at least one application operating in this fashion of gather the machine parameters may comprise a means for collecting and generating gross fingerprint data.

This process of generating a working machine fingerprint 406 may include at least one irreversible transformation, such as, for example, a cryptographic hash function, such that the input machine parameters cannot be derived from the resulting gross fingerprint data. Each gross fingerprint data, to a very high degree of certainty, cannot be generated except by the suitably configured application operating or otherwise having had access to the same computing device for which the gross fingerprint data was first generated. Conversely, each gross fingerprint, again to a very high degree of certainty, can be successfully reproduced by the suitably configured application operating or otherwise having access to the same computing device on which the identifier was first generated.

Optionally, the client device may store the fingerprint 408 in a local memory. However, in some embodiments the fingerprint is stored by the client device only temporarily to facilitate transmission to the server. This approach may lessen the risk of the fingerprint data being discovered and used for an unauthorized purpose. The client may also implement a pattern masking algorithm as described elsewhere in the specification, so that only a portion of the fingerprint data is transmitted to the client. This may reduce the risk that fingerprint data will be somehow intercepted during or after transmission, and used for some unauthorized purpose.

At 410, the client device may transmit the key and fingerprint to the server, as previously described. The server may process the key and fingerprint to develop a license file for use on the client device. If the server detects some defect in the license file, it may return a failure message to the client instead the license file, which the client may output (not shown). If the client device does not receive the license file or a failure message within a reasonable period of time (for example, 60 seconds), this may indicate a failure in communication, causing the client to transmit 410 the key and fingerprint a second time. When the server successfully authenticates the client executable, the client may receive an encrypted license file 412. The client device may decrypt the license file 414 using the software executable. Decryption at the client may comprise a means for authenticating the license file. It is desirable to prevent the software executable from being enabled by an inauthentic license file. To prevent this, the software executable may reject the license file if it is not certified to have originated from a trusted server, using a PKI certification or equivalent process. In the alternative, the client may decrypt the license file using a private (symmetric) key derived from the gross fingerprint data.

After decryption, software executable on the client device may read the information contained in the license file 416. This information may identify specific features of the executable that are enabled or disabled on the client device. The executable then operates in compliance 418 with the features specified as enabled or disabled. The software executable may be configured such that it cannot operate defined features or perform defined functions unless it receives and successfully decrypts a license file that specifies specific features or functions to be enabled or disabled. Without such data, the software executable may operate with the specified features or functions disabled.

At later times, the software executable may request and receive an updated license file. Updating may be triggered by any event that the client device is capable of detecting, including but not limited to user input or completion of a function within the executable. For example, the software executable may request and receive an updated license file after the user completes a level of play defined for a game executable. The updated executable may unlock additional levels of play using the executable. The client device may request an updated license file using a process similar to that described for the original license file. The client device may regenerate the gross fingerprint data, or retrieve a stored fingerprint, as part of this process.

Figure 6:
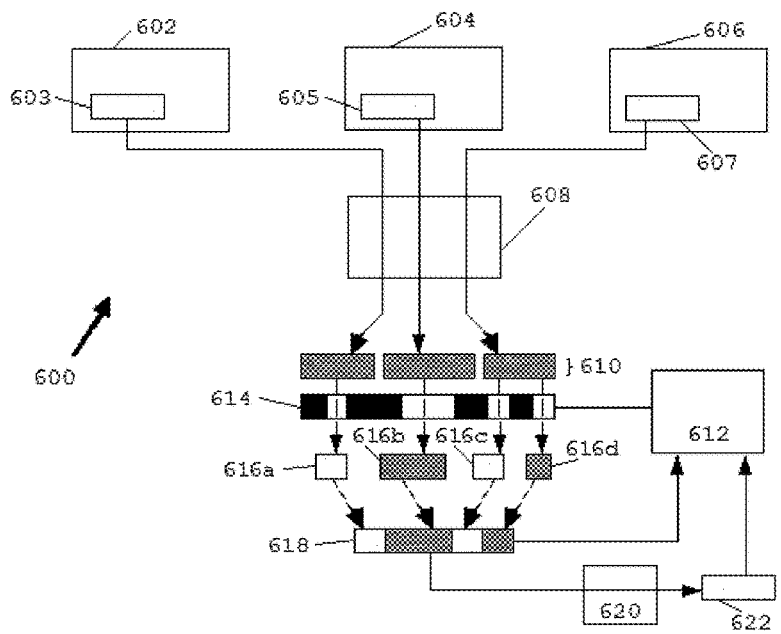
FIG. 6 is a diagram showing data elements used in generating a modular hardware fingerprint.

Pattern masking the gross fingerprint data to provide a fingerprint for transmission may provide an important feature for enhancing security of transmissions between a client and a server. FIG. 6 illustrates pattern masking 600 in the present context, using a conceptual diagram. Items 602, 604 and 606 represent components or modules of a client device that include non-user-configurable data 603, 605 and 607 concerning a stable state or configuration of client hardware or firmware. A client-side process, such as one integral to the target executable, reads the data items and compiles the data in some prearranged order to form a gross fingerprint data record 610, including the data items 603, 605 and 607 stored in defined data fields. Although only three components and data items are illustrated, in most applications many more components and data items can and should be used to compile the gross fingerprint data.

A remote process 612, such as a process operating on a server, provides a pattern mask 614 to the client device. The pattern mask specifies defined portions 616a, 616b, 616d, 616d of a data record that are to be used to compile a second fingerprint to be transmitted from the client device. Four data portions are illustrated by way of example only; any desired number of portions may be used and the portions may be selected with some overlap (no overlap is shown). In total, the data portions should identify substantially less than all of the data in gross fingerprint 610 for inclusion in the to-be-transmitted fingerprint, for example, less than 90%, or between 1% and 90%. Percentages outside of this range may also be used, but using too low of a percentage may be relatively inefficient, while using too high of a percentage may be relatively less secure. The pattern mask may also indicate an order with which the defined portions 616a, 616b, 616d, 616d should be compiled to create the second fingerprint to be transmitted, or any other desired reversible data transformation.

A client-side process such as the target executable may then extract the defined data portions 616a, 616b, 616d, 616d and compile them to provide a machine fingerprint 618. Optionally, the client device may delete the gross fingerprint 61 after the machine fingerprint 618 is defined. Although FIG. 6 shows the machine fingerprint as including data in delimited fields, this is merely for illustrative purposes. Generally, the client device should prepare the machine fingerprint as an unbroken field or data stream made up of the component items 616a, 616b, 616d, 616d, formatted such that it is difficult or impossible for a third party not in possession of the pattern mask template 614 to determine where one data item ends and the next begins.

The client device may transmit the machine fingerprint 618 to the remote process 612 in an unencrypted form. In the alternative, a client-side encryption process 620 may encrypt the machine fingerprint 618 using any suitable encryption process to provide an encrypted fingerprint 622. The client device may transmit the encrypted fingerprint to the server.

Characteristically, therefore, the machine fingerprint 618 and template 614 cannot be used to reconstruct the gross fingerprint 610. In some embodiments, the gross fingerprint can be determined only by operating the described process at the client device on which the target executable is installed, is not stored, and is deleted from temporary memory after use. In other embodiments, the gross fingerprint may be securely transmitted to a trusted server and/or stored locally.

The machine fingerprint 618 may be used in a reverse authentication process used to authenticate the server to the client device. In this process, the server transmits a reverse key to the client device that is made up of data from the machine key 618, or the gross fingerprint 610 if shared with the server. In some embodiments, the reverse key is made up of the data items 616a, 616b, 616d, 616d transformed or reordered according to a predefined template or plan that is programmed into the target executable on the client device. The client device may thereby determine whether or not the reverse key from the server is consistent with the gross fingerprint data 610 and the original masking template 614. For example, the client device may regenerate or retrieve from memory the machine key 618 generated using the template 614 and compare it to a machine key generated by applying a predetermined transformation to the reverse key from the server. If the keys match, the client device may deem the server authenticated and conversely if the keys do not match deem the server not authenticated. In the alternative, or in addition, the server may generate a second machine fingerprint using a new masking template and a gross fingerprint stored in memory. The server then transmits the second machine fingerprint and new masking template to the client device. In response, the client device may compare the second machine fingerprint to a newly-generated fingerprint generated at the client using the new masking template and the gross fingerprint data. If the fingerprints match, the client device may deem the server authenticated, and conversely, if the fingerprints do not match the client may deem the server not authenticated.

Figure 7:
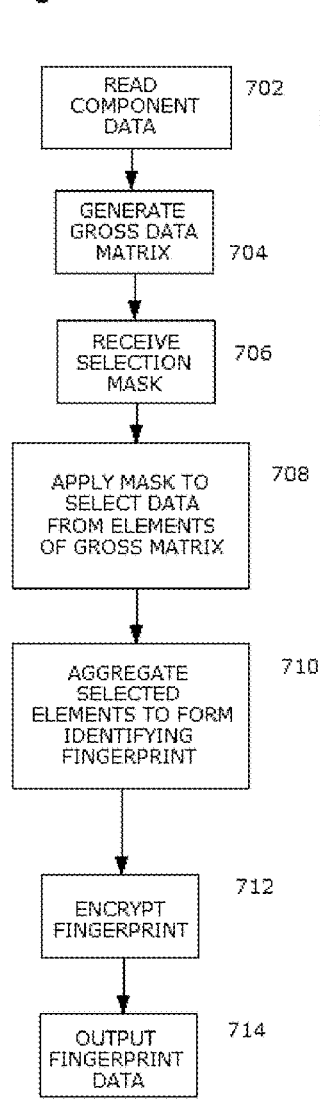
FIG. 7 is a flow chart showing a process of for generating a modular hardware fingerprint performed by a client in cooperation with a server.

In accordance with the foregoing, FIG. 7 shows a method 700 that may be performed on a client device to generate a machine fingerprint to be transmitted to another device or process. Method 700 may be used in the process discussed above in connection with FIGS. 2 and 4 to generate a machine fingerprint. At 702, the client may read the component data as discussed above in connection with FIG. 4. At 704, the client generates a gross fingerprint or data matrix comprising the component data in defined fields. At 706, the client may receive a defined selection mask or template from another device or process. At 708, the client may apply the received template to select data elements from the data matrix as discussed above. At 710, the client may aggregate the selected data elements to form fingerprint data capable of indentifying the client by stable elements of its hardware/firmware configuration. At 712, the client may encrypt the fingerprint for secure transmission. At 714, the client may output the fingerprint for use by another device or process to identify or authenticate the client device.

Figure 8:
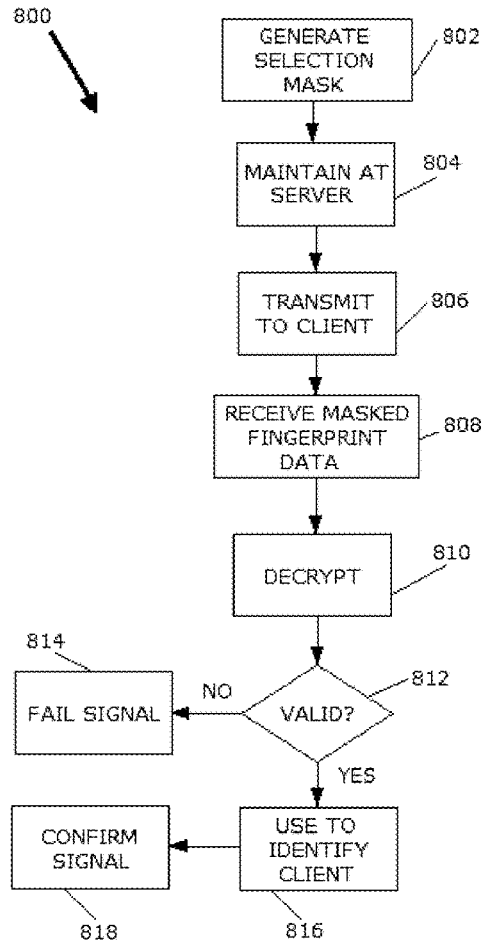
FIG. 8 is a flow chart showing a process of for generating a modular hardware fingerprint performed by a server in cooperation with a client device.

Also in accordance with the foregoing, FIG. 8 shows a method 800 that may be performed by a server or process to use a selection mask or template to authenticate or identify another device or process. At 802, the server may generate a selection mask with reference to a predefined data element or matrix. The predefined data element does not define the data itself, and instead defines a data structure in which the data will appear, for example, a structure of a database record. The selection mask should be generated to have the characteristics described above in connection with FIG. 6 and elsewhere in the specification. The server may maintain the selection mask 804 in a database or memory accessible to the server for any desired length of time.

In response to any desired trigger, for example, a client request, the server may transmit the selection mask 806 to the target client. The target client is the client device to be identified or authenticated. After transmission, server may wait for the client to process the selection mask and then receive a data item 808 from the client identified as being the fingerprint data generated using the transmitted mask. If necessary, the server may decrypt 810 the fingerprint data received from the client.

At 812, the server may determine whether or not the fingerprint data is valid. Validity may be determined by the server based on comparison to a benchmark. In an identification process, the server may determine the fingerprint is valid if it conforms to an anticipated data structure, for example, if it is made up of the expected amount and form of data. In an authentication process, the server may determine the fingerprint is valid if it matches or is consistent with an earlier fingerprint received from the same client (or from a client purporting to be the same client). If the server does not determine that the fingerprint is valid, it may perform any desired failure routine, for example generating a failure signal 814. If the fingerprint is valid, it may be saved as an identifier of the client 816. In the alternative, or in addition, the server may use it to authenticate that a client is the same as one previously identified. At 818, the server may provide a confirmation signal confirming a successful authentication or identification of the client device.

Having thus described a preferred embodiment of modular software protection, it should be apparent to those skilled in the art that certain advantages of the within system have been achieved. It should also be appreciated that various modifications, adaptations, and alternative embodiments thereof may be made without departing from the scope and spirit of the present technology. The following claims define the scope of what is claimed.

What is claimed is:

1. A method comprising:

reading component data at a client device indicating non-user-configurable settings for different hardware components of the client device, generating a data matrix comprising the component data arranged in a defined order, by aggregating the component data at the client device, applying a mask to one or more element of the data matrix, and generating a machine fingerprint data capable of identifying the client device by selecting data from the define data series according to section criteria received from the server;

receiving, at a server, a license key registered for a software executable installed on a the client device and machine fingerprint data generated at the client device;

accessing stored usage rights data indicated by the license key, using the server, wherein the usage rights data specifies a number of client devices on which the software executable is licensed to operate and which features of the software executable are enabled;

determining, using the machine fingerprint data received by the server, whether operation of the software executable on the client device would cause the number of client devices on which the software executable is licensed to operate to be exceeded; and creating, in response to the determining step, an encrypted license file for transmission to the client device that defines separate features of the software executable to be enabled on the client device.

2. The method of claim 1, further comprising creating the encrypted license file only if the server first determines that the license key is a valid key.

3. The method of claim 1, further comprising creating the encrypted license file using an asymmetrical public-private encryption method using a private key for encryption and a public key for decryption.

4. The method of claim 3, further comprising transmitting the public key from the server to the client device with a Public Key Infrastructure certificate.

5. The method of claim 3, further comprising selecting the public key consisting of the machine fingerprint data received from the client device.

* * * * *